July 15, 1958

C. H. WHITTIER 2,843,824

PULSE POWER MEASURING SYSTEM

Filed April 18, 1956

Inventor
Carl H. Whittier
by Martin Kirkpatrick
Atty.

July 15, 1958 C. H. WHITTIER 2,843,824
PULSE POWER MEASURING SYSTEM
Filed April 18, 1956 3 Sheets-Sheet 2
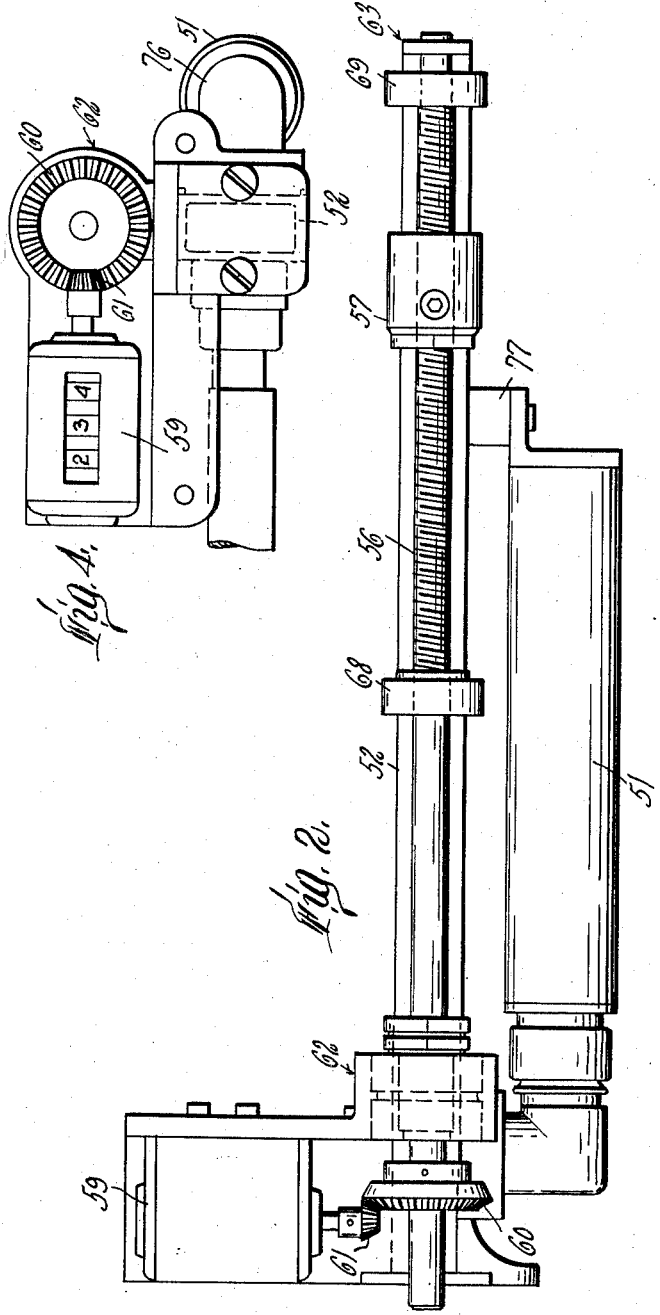
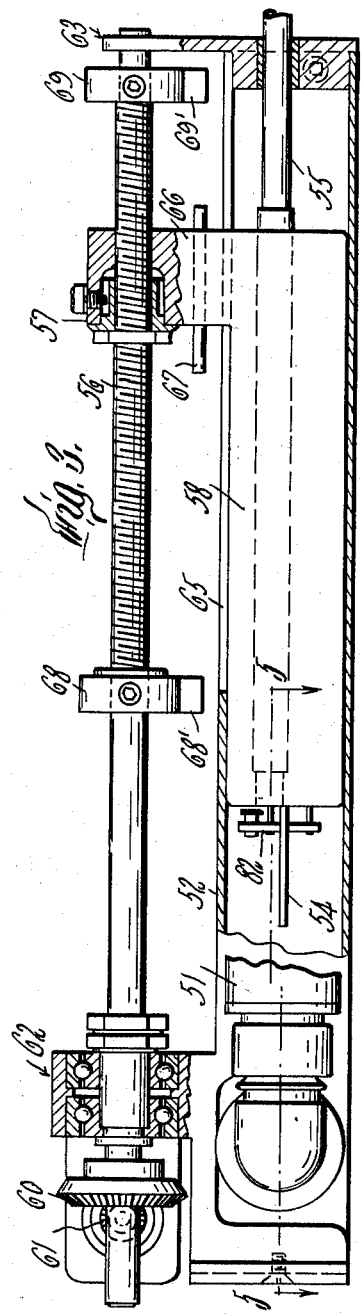
Inventor
Carl H. Whittier July 15, 1958
C. H. WHITTIER
2,843,824
PULSE POWER MEASURING SYSTEM
Filed April 18, 1956
3 Sheets-Sheet 3
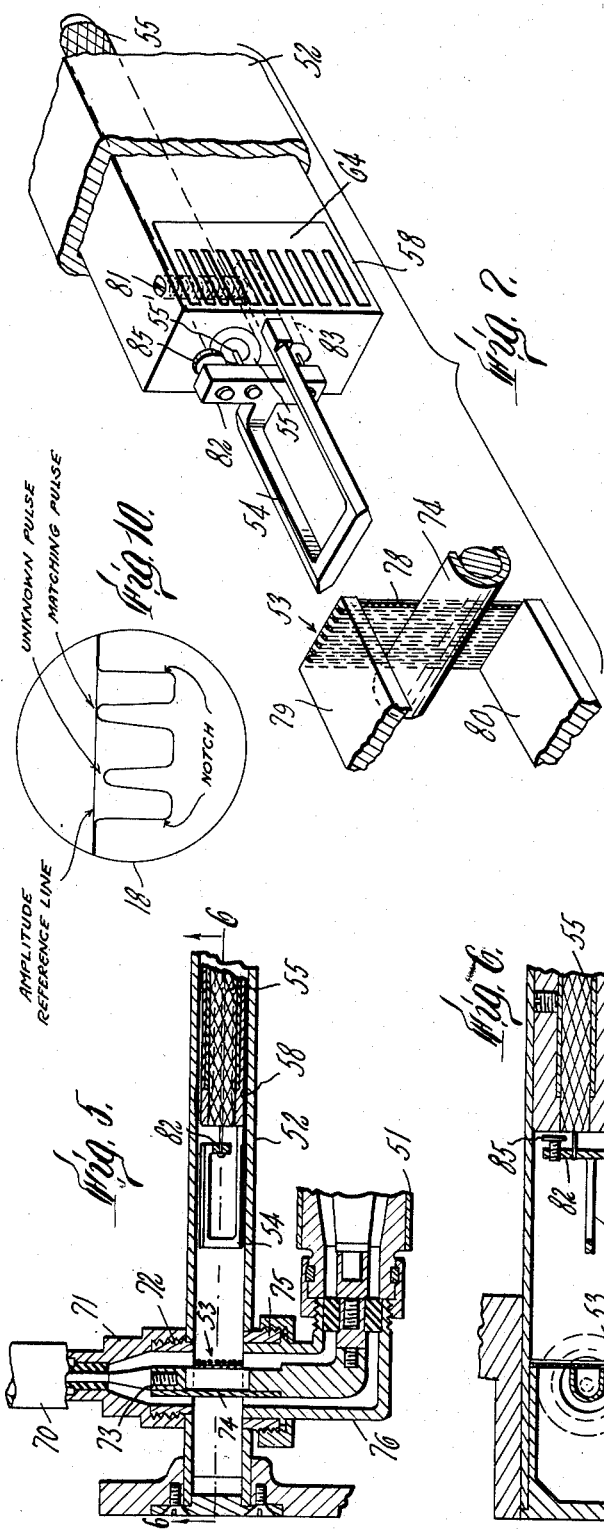
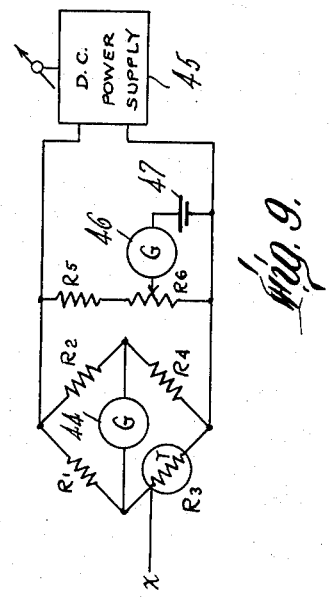
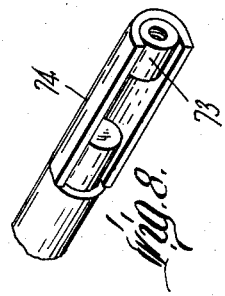

United States Patent Office 2,843,824
Patented July 15, 1958

2,843,824
PULSE POWER MEASURING SYSTEM

Carl H. Whittier, Sharon, Mass., assignor to General Communication Co., Boston, Mass., a corporation of Massachusetts Application April 18, 1956, Serial No. 578,934

14 Claims. (Cl. 324—121)

This invention relates generally to measuring systems, and more particularly, it relates to a power measuring system for pulsed radio frequency signals.

A disadvantage of conventional systems for measuring the power of pulsed radio frequency signals is that they generally require means to produce a selected amount of attenuation of the signal to be measured depending on its strength, and an absolute knowledge of the amount of attenuation produced in each case. This is because known devices capable of actually measuring the power of such signals to a fairly high order of accuracy are operable only at relatively low power levels and only over a relatively small range of power. Since it is generally impractical if not impossible accurately to calibrate and maintain the calibration of a variable attenuator suitable for use in these systems in terms of absolute attenuation values, the overall accuracy of the systems has been greatly impaired.

Another disadvantage of conventional measuring systems for pulsed radio frequency signals is that they are generally incapable of measuring directly the peak or pulse power of the signals. That is to say, only average power is measured, and therefore it follows that a knowledge of the duty cycle of the signals is also required in order to determine their peak powers.

It is an object of this invention therefore to provide a power measuring system for pulsed radio frequency signals which is inherently more accurate than conventional systems of this same general class.

It is another object of the invention to provide a power measuring system to measure directly the peak or pulse power of pulsed radio frequency signals.

In brief, there is included in the pulse power measuring system of the present invention a variable frequency oscillator whose output wave is interrupted periodically by a modulator so as to provide, in effect, a notched radio frequency (R. F.) signal, to which the pulsed R. F. signal of unknown power is referred. First, however, the frequency of this reference signal is caused to equal that of the unknown signal by means which include a tunable R. F. amplifier, and the power level of the reference signal is caused to equal a preselected value by means of a bolometer bridge. Thereafter, the signals are individually operated upon in such a way that an oscilloscope display of their demodulated waveforms may be adapted to represent their relative R. F. power levels.

To accomplish this result, there is provided for connection between the variable frequency oscillator and a mixer, a fixed attenuation channel having a detector in its output circuit, and there is provided for connection between the source of the unknown signal and the mixer, a variable attenuation channel also having a detector in its output circuit. The mixer in turn is coupled to an oscilloscope display via an amplifier. Included in the variable attenuation channel, ahead of the detector, is a variable attenuator which is initially adjusted so that the amplitude of the reference signal as it appears on the scope is the same irrespective of which of the channels it traverses. In other words, the overall attenuation of the variable attenuation channel is effectively balanced against that of the fixed attenuation channel by alternately applying the reference signal to each channel and adjusting the variable attenuator until the demodulated reference signal amplitude is the same in each case. It follows therefore that when the oscillator and the source are both connected to the mixer through the respective channels as aforementioned, the amplitude relation of the signals as they appear on the scope will accurately reflect their relative R. F. power levels.

Also included in the system are various timing circuits to control the phase of the horizontal sweep generator for the oscilloscope and also to control the relative times of occurrence of the pulses and the notches in the reference signal. In this way, the oscilloscope display may be caused to take the form of a single notch representative of the demodulated reference signal and a pulse within the notch representative of the demodulated unknown signal. To measure the difference in power levels between the signals, the amplitude of the pulse is increased or decreased as required to conform its amplitude to that of the notch. This is done by increasing or decreasing, as the case may be, the amount of attenuation provided by the variable attenuator. Since the attenuator is susceptible of accurate calibration to indicate the amount of such a change in attenuation (as opposed to indicating absolute values of attenuation) and since the power level of the reference signal is known, it follows that the absolute power level of the unknown signal may then be readily calculated. Alternatively, if the power level of the reference signal is established at one fixed value, such as one milliwatt for example, the indicated change in the setting of the variable attenuator may be arranged to indicate directly the power level of the unknown signal.

The novel features of the invention, together with further objects and advantages thereof, will become more readily apparent from the following detailed description of a preferred embodiment of the invention wherein reference will be had to the accompanying drawings. In the drawings:

Fig. 2 is a plan view of the novel attenuator employed in this system also in accordance with the invention;

Fig. 3 is a side view in elevation of the attenuator;

Fig. 4 is a front view in elevation of the attenuator, showing the indicating mechanism associated therewith in somewhat more detail;

Fig. 5 is a sectional view taken on line 5—5 of Fig. 3;

Fig. 6 is a sectional view taken on line 6—6 of Fig. 5;

Fig. 7 is a perspective view on an enlarged scale of the interior of the attenuator;

Fig. 8 is a perspective view on an enlarged scale of an inner conductor element of the attenuator;

Fig. 9 is a schematic diagram of the bolometer bridge associated with the measuring system also in accordance with the invention; and Fig. 10 is a representation of the oscilloscope display produced by the measuring system of the invention.

Figure 1:
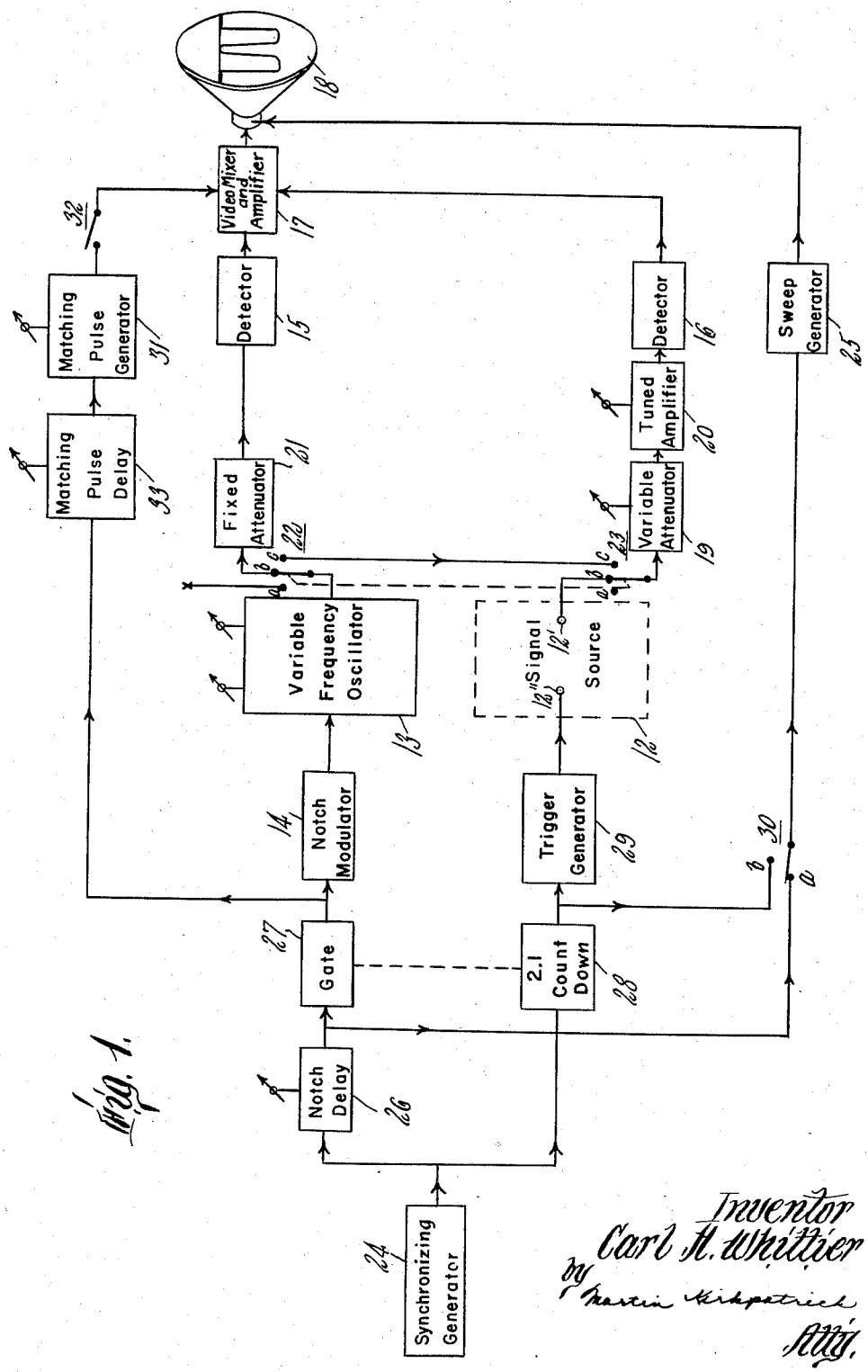
Fig. 1 is a block diagram of the pulse power measuring system according to the present invention.

As shown in Fig. 1, the measuring system of the present invention includes a variable frequency oscillator 13 under the control of a notch modulator 14 to provide a radio frequency (R. F.) reference signal for comparison with the pulsed R. F. signal of unknown power. The source of the unknown signal is represented by a block 12 and has associated therewith an R. F. output terminal 12' and a synchronizing circuit input terminal 12" or its equivalent, which those skilled in the art will recognize as common to practically all such sources. Connected to the variable frequency oscillator 13 is a switch 22 adapted to apply the reference signal to a first attenuation channel including a fixed attenuator 21, and connected to the R. F. output terminal of the signal source 12 is a switch 23 adapted to apply the unknown signal to a second attenuation channel including a variable attenuator 19 and a tuned amplifier 20. A pair of detectors 15 and 16 are provided in the output circuits of the respective channels to demodulate the reference signal and the unknown signal which are then combined in a mixer-amplifier 17 for presentation on an oscilloscope 18.

Switches 22 and 23 are ganged and also serve to connect the oscillator 13 to the variable attenuator 19, or alternatively, to connect the oscillator 13 to a terminal $x$. To this end, each of the switches is provided with a movable arm and three fixed terminals $a$, $b$ and $c$ (or coaxial switch equivalents thereof) which are selectively connected to the movable arm according to its angular position. The movable arm of switch 22 is connected to oscillator 13, terminal $a$ thereof is connected to a terminal $x$, terminal $b$ is connected to the fixed attenuator 21, and terminal $c$ is connected to the terminal $c$ of switch 23. Switch 23, on the other hand, has its movable arm connected to variable attenuator 19 and its $b$ terminal connected to the R. F. output terminal 12' of the signal source 12. Terminal $a$ of switch 23 is unused. When the switches 22 and 23 are in their "$a$" positions, it will be observed that the reference signal is applied to terminal $x$ whereas the signal source 12 is open circuited. Terminal $x$ constitutes the R. F. input terminal of a bolometer bridge whereby the power level of the reference signal is established, as will be described in detail hereinafter. Alternatively, when the switches 22 and 23 are in their "$b$" positions, the reference signal is applied to the fixed attenuation channel and the unknown signal is applied to the variable attenuation channel. With switches 22 and 23 in their "$c$" positions, signal source 12 is again open circuited, and the reference signal is applied to the variable attenuation channel for the purpose of balancing the overall attenuations of the channels as will likewise be elaborated upon hereinafter.

Various timing circuits are also provided according to the invention not only to expedite the process of comparing the power level of the unknown signal with that of the standard signal by reference to the display on the oscilloscope, but also to permit such comparison to be made much more accurately than might be done otherwise. These timing circuits include a synchronizing generator 24 which controls the repetition rates associated with both R. F. signals and also the horizontal sweep of the oscilloscope 18. To synchronize the repetition rate of the reference signal notches, synchronizing generator 24 is connected to a variable notch delay 26, which consists of a conventional monostable multivibrator circuit whose output pulses may be delayed by a selected amount with respect to the synchronizing pulses produced by the synchronizing generator. Notch delay 26, in turn, is connected to a gating circuit 27 which is adapted to transmit only alternate ones of the "delayed" pulses to the notch modulator, thereby synchronizing the latter at one half the rate of the synchronizing pulses. To synchronize the repetition rate of the unknown signal pulses, synchronizing generator 24 is also connected to a 2:1 count-down circuit 28 to provide output pulses whose repetition rate is one half that of the synchronizing pulses, and count-down circuit 28 is connected to a trigger generator 29. Generator 29 serves to trigger the modulator circuit (terminal 12") associated with signal source 12 so that the unknown signals likewise will have a repetition rate which is one half that of the synchronizing pulses. The dotted line between the count-down circuit 28 and the gating circuit 27 indicates that the gate is driven by the count-down circuit, and thereby synchronized.

The sweep generator 25 for the oscilloscope 18 is adapted to be synchronized either at the same rate as the synchronizing pulses or at one half this rate, according to the position of a switch 30. Switch 30 has a movable arm and two fixed terminals $a$ and $b$, the former being connected to the notch delay 26 and the latter being connected to the count-down circuit 28. The movable arm of the switch 30 is connected to the sweep generator 25. Accordingly, when the switch 30 is in the "$a$" position, sweep generator 25 will be synchronized by the "delayed" pulses from notch delay 26 whose repetition rate is the same as that of the synchronizing pulses; and when the switch is in the "$b$" position, the sweep generator will be synchronized by the output pulses from the count-down 28 whose repetition rate is one half that of the synchronizing pulses. These sweep rates will be referred to hereinafter as short and long sweeps respectively.

Completing so much of the measuring system as is illustrated in Fig. 1, is a video matching pulse generator 31 and a matching pulse delay 33 similar to notch delay 26. Matching pulse delay 33 is connected between the gate 27 and the matching pulse generator 31 to synchronize the latter at one half the rate of the synchronizing pulses and at the same time to provide a variable delay between the times of occurrence of the synchronizing pulses and the times of occurrence of the pulses generated by the matching pulse generator. The latter, in turn, is connected through a switch 32 to mixer 17 wherein the matching pulses are combined with the demodulated R. F. signals when the switch 32 is closed. By virtue of this arrangement, amplitude marking of the reference signal, as is required to initially balance the attenuation channels, may be accomplished with a degree of precision which is otherwise unobtainable. This will be made clear in the description of the operation of the system following.

To measure the power level of the unknown signal produced by signal source 12, switch 30 is placed in its "$b$" or long sweep position and switches 22 and 23 are placed in their "$b$" positions (the positions shown) so that the unknown signal is applied to the variable attenuation channel and the reference signal is applied to the fixed attenuation channel. Amplifier 20 is adjusted for maximum amplification of the unknown signal by reference to the amplitude of the unknown signal pulse appearing on the oscilloscope. The variable frequency oscillator 13 is then tuned to this same frequency by placing the switches 22 and 23 in their "$c$" positions and varying the frequency of the oscillator until the amplitude of the reference signal is likewise a maximum as indicated by the height of the notch appearing on the scope. Next, the power level of the reference signal is caused to equal a preselected value. To accomplish this result, switches 22 and 23 are moved to their "$a$" positions and the modulator 14 is disabled by any convenient means so that the reference signal, which is now unmodulated, is applied to terminal $x$, the input terminal of the bolometer bridge. This bridge and its mode of operation will be described at a later point to make the description of the system as a whole more clear. Suffice it to say at this point that once the power level of the reference signal has been established at a known level, the notch modulator 14 is once again placed in operation and the switches 22 and 23 are returned to their "$b$" positions. With the object in view of balancing the overall effects of the variable attenuation channel and the fixed attenuation channel, switch 32 is also closed so as to provide in combination with the demodulated reference signal or notch, appearing on the scope, a matching pulse, whose amplitude is adjusted in the matching pulse generator 31 to match the amplitude of the notch. This adjustment is carried out with switch 30 in its "$a$" position so that the horizontal sweep recurs at twice the rate of the notch and the matching pulse. As a result, a portion of the reference signal wave between the notches is superimposed on the display and appears as an amplitude reference line across the top of the notch. It is to the level of this reference line, which precisely specifies the amplitude of the notch, that the peak of the matching pulse is adjusted. Upon completion of this adjustment, switches 22 and 23 are then placed in their "c" positions so that the reference signal is applied to the variable attenuation channel, and variable attenuator 19 is adjusted until the amplitude of the notch is the same as it was when applied through the fixed attenuation channel. That is to say, variable attenuator 19 is adjusted until once again the amplitude of the notch is equal to the amplitude of the matching pulse, the matching pulse serving in effect, as an electronic cursor or marker to indicate the amplitude of the notch as it appeared when the reference signal was applied through the fixed attenuation channel. In this way, parallax effects, which would cause unduly large errors if the notch amplitudes were measured independently by means of a conventional scale, are avoided entirely.

After the attenuations of the channels have been equalized, switches 22 and 23 are returned to their center or "b" positions and the switch 32 may be opened so that the matching pulse is removed from the scope. The system is now in condition for the final adjustment of the variable attenuator from which the pulse power level of the unknown signal may be determined. To expedite making this adjustment, switch 30 is also moved to its "b" position and the position of the notch is altered, if necessary, so that the unknown signal pulse lies within the notch. This is accomplished by varying the setting of the notch delay 26 which controls the times of occurrence of the reference signal notches relative to the unknown signal pulses and the sweep, when switch 30 is in the "b" or long sweep position.

Switch 30 is then returned to its "a" or short sweep position wherein the sweep generator is synchronized at twice the rate of the notch modulator 14 and the modulation circuit associated with signal source 12 so that the amplitude reference line appears across the top of the notch, as aforementioned. Since the phase of the sweep voltage relative to the times of occurrence of the unknown signal pulses and the reference signal notches remains the same when switch 30 is repositioned, it follows that the pulse will remain in the notch as shown on the scope. At the same time, the notch and the pulse will become centered on the scope automatically if the fixed delays in the timing circuits for the oscillator and the signal source are suitably proportioned. Thereafter, a slight readjustment of the notch position by means of notch delay 26 may be made if desired to center the pulse in the notch more precisely. When the notch delay 26 is adjusted with the switch 30 in the short sweep position, it is interesting to note that the unknown pulse will appear to move while the notch remains stationary. This is because the times of occurrence of the notches and the sweep triggers will both change simultaneously by equal amounts.

Having centered the unknown pulse within the notch, it now remains only to conform the amplitude of the pulse to that of the notch. Thus, variable attenuator 19 is adjusted until the tip of the pulse, as shown in Figs. 1 and 10, coincides with the amplitude reference line associated with the notch. The amount of change in the variable attenuator setting necessary to produce this result represents the increased or decreased amount of attenuation of the unknown signal required to match its power level to that of the reference signal. It follows, therefore, that the power level of the unknown signal may be readily obtained by applying this attenuation difference value to the preselected value at which the power level of the reference signal was initially established.

The bolometer bridge, whereby the power level of the reference signal is established will now be described with reference to Fig. 9. From Fig. 9 is will be observed that the arms of the bridge are formed with resistors $R_1$, $R_2$, $R_3$ and $R_4$, and that terminal $x$, which is connected to the terminal $a$ of switch 22, as shown in Fig. 1, constitutes the R. F. input terminal of the bridge. Resistor $R_3$ comprises a thermetic element which is adapted to serve as a load for the oscillator 13, and resistors $R_1$, $R_2$ and $R_4$ comprise standard resistors of known resistance value. In this embodiment $R_1$ and $R_2$ are equal although those skilled in the art will recognize that this is not essential. Connected to the output of the bridge between the junctions $R_1$, $R_3$ and $R_2$, $R_4$ is a galvanometer 44, and connected to the input of the bridge between the junctions $R_1$, $R_2$ and $R_3$, $R_4$ is a regulated D. C. power supply 45. A resistor $R_5$ of known resistance and a calibrated potentiometer $R_6$ in series relation to one another are also connected across power supply 45, the movable arm of the potentiometer being connected to one side of a galvanometer 46. The other side of galvanometer 46 is maintained at a fixed positive potential by a standard cell 47 whose negative terminal is connected to the junction $R_3$, $R_4$.

The manner in which the bridge circuit is utilized to establish the power level of the reference signal is as follows. First switches 22 and 23 are placed in either their "b" or "c" positions so that there is no R. F. power supplied to element $R_3$, and the bridge is balanced by varying the power supply voltage until galvanometer 44 indicates zero, evidencing that resistances $R_3$ and $R_4$ are equal. The power supply voltage is then measured by adjusting potentiometer $R_6$ until galvanometer 46 also indicates zero. Under these conditions, the voltage drop across the lower portion of the potentiometer will be equal to the standard cell voltage. Since the potentiometer is calibrated to indicate the resistance of this lower portion, and since the values of the total potentiometer resistance, the standard cell voltage, and the fixed resistance $R_5$ are known, it follows that the value of the supply voltage may be readily calculated. This voltage value in conjunction with the known values of resistors $R_1$, $R_2$ and $R_4$ is then utilized to calculate the D. C. power input to the thermetic element.

Assuming by way of example that one milliwatt is the preselected power level at which the reference signal is to be established, power supply 45 is now readjusted such that its voltage is reduced by an amount calculated to maintain the bridge in balance with one milliwatt of R. F. power added to $R_3$. In other words, what is calculated is the reduction in the power supply voltage necessary to reduce the D. C. power input to the bridge by one milliwatt asuming the bridge is always in balance. To obtain this reduced value of the supply voltage, potentiometer $R_6$ is reset to a new computed value such that the potential of its movable arm will be equal to the potential of the standard cell when the power supply has been correctly adjusted. Switches 22 and 23 are then placed in their "a" positions, whereby the unmodulated R. F. reference signal is supplied to $R_3$. If the power level of the reference signal itself is now adjusted in oscillator 13 to rebalance the bridge, as evidenced by a zero indication of galvanometer 44, it follows that the amount of R. F. power to the thermetic element $R_3$ will be exactly equal to the amount by which the D. C. power thereto was reduced, namely one milliwatt.

In Figs. 2 through 8 there is illustrated in detail the attenuator 19 which is especially adapted for use in the system of the present invention in that it is not only susceptible of very precise calibration, but also is capable of handling large amounts of input power. With reference now to Figs. 2 through 8 those skilled in the art will recognize that the attenuator operates on the waveguide beyond cut-off principle, and comprises in essence: a high power dummy load 51; a waveguide attenuating section 52; an input feed system whereby the major portion of the attenuator input power is supplied to the load and a relatively smaller portion is coupled into the waveguide; a mode filter 53 adapted to attenuate undesired modes of propagation in the guide with a minimum of attenuation of the preferred mode; a coupling loop 54 to couple energy from the guide into a coaxial output line 55, and means to move the loop axially in the guide so that the amount of attenuation which the output wave suffers in traversing the guide may be increased or decreased according to the spacing between the coupling loop and the mode filter. It is evident from Figs. 2 and 3 that very precise means are provided for moving the coupling loop and indicating its position, such means being constituted by a screw 56 which cooperates with a nut 57 rigidly attached to a slidable block 58, and a revolution counter 59 which is rotatably coupled to the screw by a bevel gear 60 and a pinion 61. The end portions of the screw 56, which are unthreaded, are mounted in suitable bearings 62, 63 and the latter are supported above the guide such that the screw 56 extends parallel to the guide axis. Gear 60 is rigidly mounted on the end of the screw towards the left of Figs. 2 and 3, and pinion 61 is rigidly mounted on the shaft of the counter 59. A platform rigid with the guide 52 is provided to support the counter so that the pinion 61 meshes with gear 60.

As shown, block 58 which carries the loop 54, is maintained in electrical contact with the guide by fingers 64, and is adapted for axial sliding movement within the guide when the screw 56 is rotated. To this latter end, there is provided a longitudinal slot 65 in the top wall of the guide, and an arm 66 of slightly less width than the slot extends into the guide through the slot. At one of its ends, arm 66 is made rigid with the block 58 and at the other of its ends the arm is adapted to mount the nut 57. A pin 67 projects from either side of the arm for engagement with a pair of stops 68 and 69. Stops 68 and 69 are rigidly attached to the screw adjacent its threaded portion, and take the form of collars which include radially projecting key portions 68' and 69'. As is apparent, when the block and hence the pin 67 have been moved to the extent that one of its ends reaches one of the stops, the key on the stop will be rotated into engagement with the pin thereby preventing further rotation of the screw.

The manner in which the attenuator is constructed from the standpoint of its operation electrically may best be understood with reference to Fig. 5, which illustrates the input feed system to the attenuator, and Figs. 6 and 7 which illustrate the manner in which R. F. energy is coupled into and out of the guide. With reference first to Fig. 5, it will be observed that the input power to the load 51 is supplied through a coaxial cable 70, fitted at its end with a tapered screw connector 71. Connector 71 mates with a threaded member 72 which is rigidly attached to a broad wall of the guide and which forms in effect an extension of the outer conductor of connector 71 so far as the broad wall. Contrariwise, the inner conductor 73 of the connector 71 is effectively extended completely through the guide by a mating inner conductor element 74, the broad walls of the guide being suitably apertured to receive element 74. Affixed to the broad wall of the guide opposite connector 71 is another threaded member 75 onto which is threaded one end of a right angle connector 76 whose inner conductor mates with element 74. The other end of right angle connector 76 is in turn coupled to the dummy load 51, which as best seen in Fig. 2, lies parallel to the guide and is affixed thereto at its end remote from the connector 76 by a spacer block 77.

Those skilled in the art will recognize that the major portion of the power carried by the coaxial line 70 will be transmitted to the dummy load 51, but as is of course most significant, a relatively smaller portion will be coupled into the guide 52 by means of the element 74. Thus, the latter serves in effect as a radiating element whereby energy is transferred to the guide. To limit the mode of propagation of this energy as much as possible to the fundamental $TE_{01}$ mode, so that the attenuator may be calibrated more precisely, there is provided adjacent the inner conductor section 74 a mode filter 53, as aforementioned. This filter, as best seen in Fig. 7, comprises a grid of thin wires 78 which extends between the narrow walls of the guide at right angles to the electric field in the fundamental mode of propagation and is supported between a pair of plates 79 and 80 in contact with the narrow walls. Plates 79 and 80 extend toward the leftward end of the guide where suitable provision is made for fastening them such that a short circuit termination is provided at this end. There is also provided a backing sheet of insulating material such as Teflon to lend additional support to the wires and to insulate them from the element 74.

Disposed adjacent the mode filter 53, as shown in Fig. 7 is the coupling loop 54 which, it will be observed, is shaped as a rectangle whose longer sides are beveled to form knife-like edges extending parallel to the guide axis. One end of the loop extends into the block 58 where it is held by a set screw 81, and the other end of the loop is attached to a vertical bar 82 extending at right angles to the narrow walls of the guide substantially midway between the broad walls. The inner conductor 55' of line 55 is connected to bar 82 and the outer conductor is connected to the block. One end of a resistor 83 is also connected to the bar 82, the body of the resistor being mounted in a bore in the block. A set screw 84 serves to retain the resistor within the bore and at the same time to provide a good electrical connection between the block and a cap-like connector provided on the other end of the resistor. At the opposite end of the bar from the resistor termination, there is provided a capacitive element 85 whose shank is threaded through the bar so that the spacing between the element and the block may be adjusted to vary the capacitance to the block and thereby improve the impedance match between the guide and the output line 55.

A detailed view of the inner conductor element 74 is shown in Fig. 8. From Fig. 8, it will be observed that the element 74 is shaped like a hollow semicylinder, and from Figs. 6 and 7 it will be observed that what might be termed the open or flat side of the element lies closely adjacent the grid of the mode filter 78. As a result, a predetermined amount of capacitance is provided between the inner conductor element and the guide to compensate for the lack of an outer conductor in this region. This enhances the impedance match between the coaxial input line 70, and the combined loads of the guide 52 and the load 51.

In operation, the input power to the attenuator, supplied through input line 70, is in effect divided between the dummy load 51 and the guide 52 by means of element 74, the larger portion being transmitted to the dummy load 51 where it is absorbed, and a relatively smaller portion being transferred to the guide. Because of the mode filtering effect of the wire grid adjacent element 74, higher order modes of energy excited in the guide are attenuated extremely rapidly. This permits an accurate calculation to be made of the attenuation characteristic of the guide as a function of distance from the element 74, since, for the most part, only the fundamental $TE_{01}$ mode of energy propagation in the guide need to be taken into account. It follows, that the axial position of the loop 54, or more particularly, its spacing from the element 74, as indicated by counter 59 may be precisely precalibrated in terms of relative attenuation values, in furtherance of the operating procedure for the system as a whole described in the foregoing.

What is claimed is:

1. A power measuring system for pulsed radio frequency signals comprising first and second means to attenuate radio frequency signals, said second means including a calibrated adjustable attenuator to provide different amounts of attenuation and to indicate the relation of said amounts, means visually to display radio frequency signals from said attenuation means in demodulated form, means to provide a first radio frequency signal of known power level to serve as a reference for a second pulsed radio frequency signal of unknown power level to be determined, and means alternately to apply one of said signals to said attenuation means to initially balance the amounts of attenuation provided thereby, and thereafter simultaneously to apply said first and second signals to the respective attenuation means to determine the power relation between said signals.

2. A power measuring system according to claim 1 wherein said first signal is periodically interrupted or notched for a duration of time exceeding the duration of the pulses associated with said second signal.

3. A power measuring system according to claim 2 including means to synchronize the repetition rate of the notches in said first signal with the repetition rate of the pulses.

4. A power measuring system according to claim 3 including means to vary the times of occurrence of the notches and the pulses relative to one another to the end that the pulses may be caused to occur during the times of occurrence of the notches.

5. A power measuring system for pulsed radio frequency signals comprising: a pair of attenuation channels each of which includes a detector to demodulate radio frequency signals applied thereto and at least one of which includes a calibrated adjustable attenuator to provide different amounts of attenuation in the one channel and to indicate the relation of said amounts, a mixer to combine demodulated radio frequency signals from said channels, said mixer having a pair of input circuits coupled to said detectors, respectively, and an output circuit, means coupled to the output circuit of said mixer to indicate visually the amplitudes of demodulated radio frequency signals from said channels, means to provide a first radio frequency signal of known power level to serve as a reference for a second pulsed radio frequency signal of unknown power to be determined, and means alternately to apply one of said signals to each channel initially to balance the overall attenuations of the channels, and thereafter simultaneously to apply both signals to the respective channels to determine the power relation between said signals.

6. A power measuring system according to claim 5 including means to conform the frequency of said first signal to that of said second signal and thereby avoid the effect of a dependence on frequency of the attenuations of said attenuation channels.

7. A power measuring system according to claim 6 wherein said last-named means comprises a tunable amplifier in one of said attenuation channels.

8. A power measuring system for sources of pulsed radio frequency signals comprising a first and a second attenuation channel each including a detector to demodulate radio frequency signals applied thereto and said second channel including a calibrated adjustable attenuator to provide different amounts of attenuation in said second channel and to indicate the relation of said amounts, a mixer to combine demodulated radio frequency signals from said channels, said mixer having a pair of input circuits coupled to said detectors, respectively, and an output circuit, an oscilloscope having a vertical deflection circuit coupled to the output circuit of said mixer to display visually the waveforms of demodulated radio frequency signals from said channels, a variable frequency oscillator to provide a sinusoidal radio frequency signal to serve as a reference for a pulsed radio frequency signal of unknown power, means to conform the frequency of the sinusoidal signal to that of the pulsed signal, means to measure the power level of the sinusoidal signal, a modulator coupled to said oscillator periodically to interrupt or notch the sinusoidal signal once its power level has been measured, a synchronizing signal generator, means coupling said modulator and the source of the pulsed signal to said synchronizing generator to synchronize the repetition rates of the notches in the sinusoidal signal and the pulses of the pulsed signal, said coupling means including an adjustable time delay circuit whereby the pulses may be caused to occur during the times of occurrence of the notches, and switch means alternately to apply the notched sinusoidal signal to each of said channels initially to balance the overall attenuations of the channels and thereafter simultaneously to apply the notched signal and the pulsed signal to said first and second channels, respectively, to determine the power relation between said signals.

9. A power measuring system according to claim 8 including a horizontal sweep generator for the oscilloscope and means optionally to synchronize the horizontal sweep generator at the same rate as said notches and said pulses and at twice such rate.

10. A power measuring system according to claim 8 wherein said means to measure the power level of the sinusoidal signal comprises a bolometer bridge.

11. A power measuring system according to claim 8 wherein said means to conform the frequencies of said sinusoidal signal and said pulsed signal comprises a tunable amplifier connected between the variable attenuator and the detector in said second attenuation channel.

12. A power measuring system according to claim 8 wherein said coupling means includes a gate circuit coupled to said modulator and a count-down circuit coupled to said source to synchronize the repetition rates of said notches and said pulses at one half the rate of said synchronizing signals.

13. A power measuring system according to claim 12 including a horizontal sweep generator for the oscilloscope and switch means optionally to connect said sweep generator to said delay circuit and to said count-down circuit thereby optionally to synchronize the sweep generator at the same rate as the synchronizing generator and at one half this rate.

14. A power measuring system for pulsed radio frequency signals comprising first and second means to attenuate radio frequency signals, said second means including a calibrated adjustable attenuator to provide different amounts of attenuation and to indicate the relation of said amounts, means visually to display radio frequency signals from said attenuation means in demodulated form, means to provide a first radio frequency signal of known power level to serve as a reference for a second pulsed radio frequency signal of unknown power level to be determined, means alternately to apply said first signal to said attenuation means and thereafter simultaneously to apply said first and second signals to the respective attenuation means, and means to provide recurrent pulses of selected amplitude for visual display in combination with said first signal to mark its amplitude level when the same is first applied to said second attenuation means.

References Cited in the file of this patent
UNITED STATES PATENTS

| | | |
|---|---|---|
| 2,532,817 | Lafferty et al. | Dec. 5, 1950 |
| 2,563,395 | Carpentier | Aug. 17, 1951 |
| 2,735,067 | Deibler et al. | Feb. 14, 1956 |